Aug. 26, 1941.　　　J. H. REYNOLDS　　　2,253,581
CONTINUOUS INSPECTION DEVICE
Filed July 1, 1939　　　3 Sheets-Sheet 1

Inventor
James H. Reynolds.
By T. Wilson Corder
Attorney

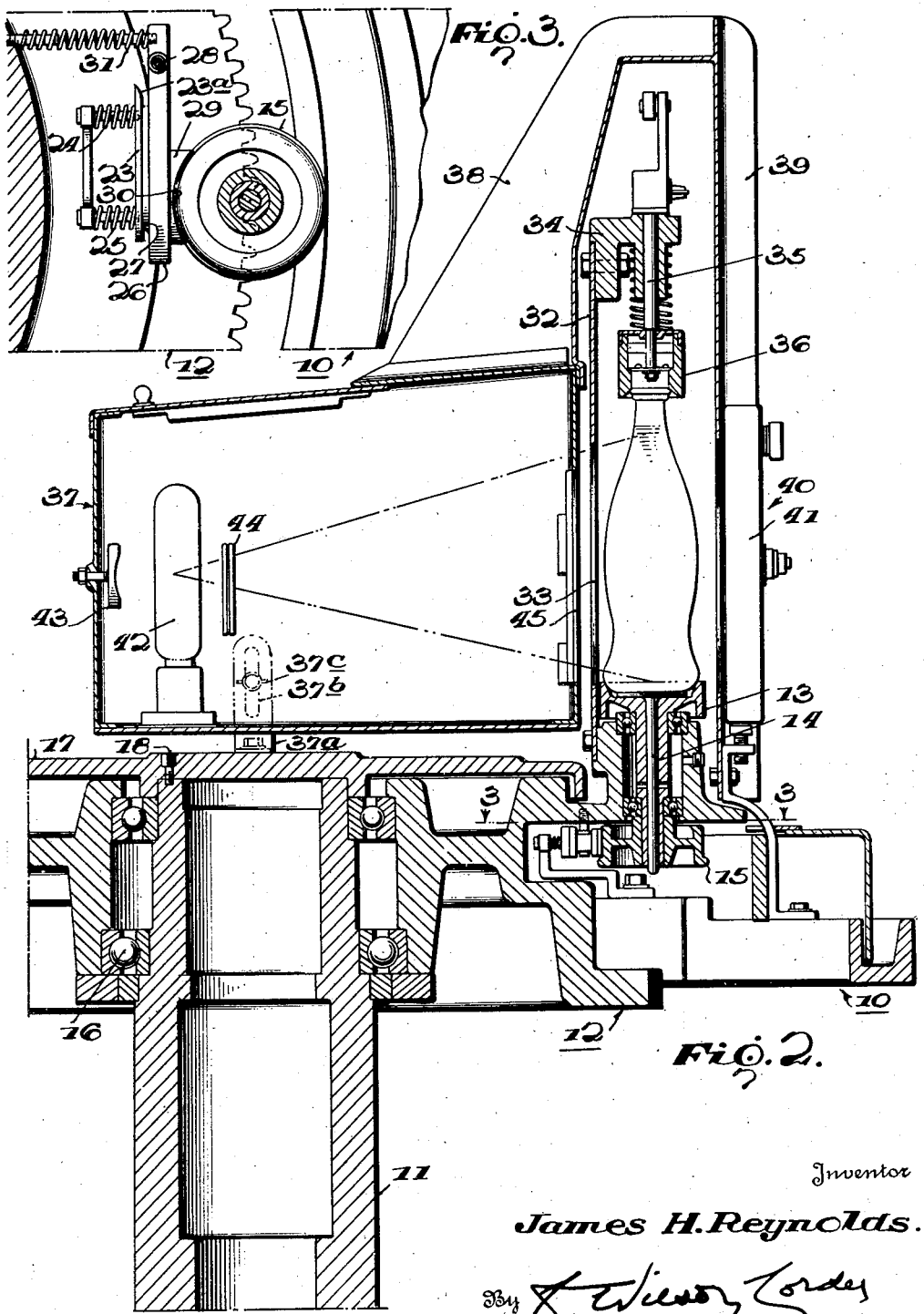

Aug. 26, 1941.   J. H. REYNOLDS   2,253,581
CONTINUOUS INSPECTION DEVICE
Filed July 1, 1939   3 Sheets-Sheet 3
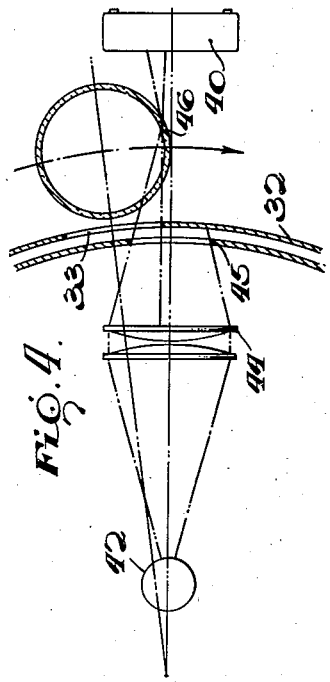
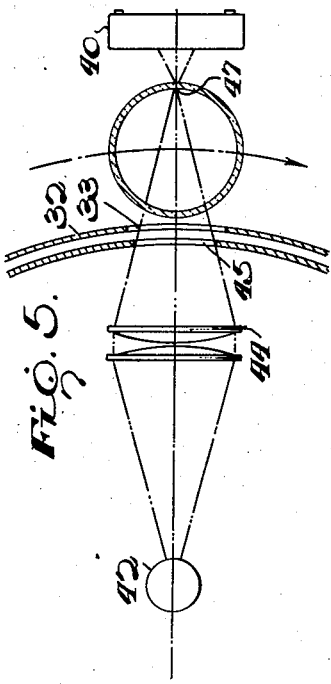
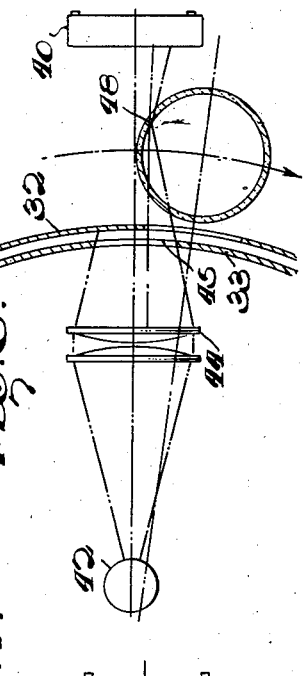
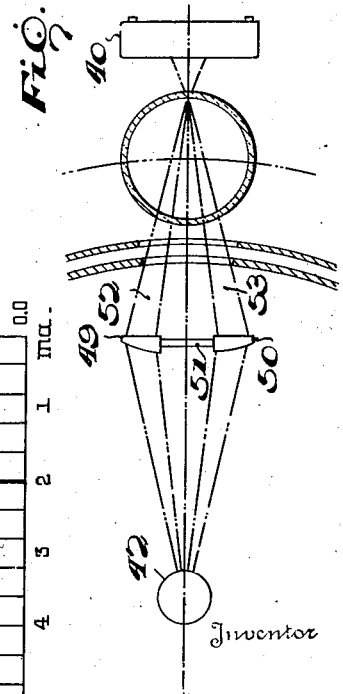
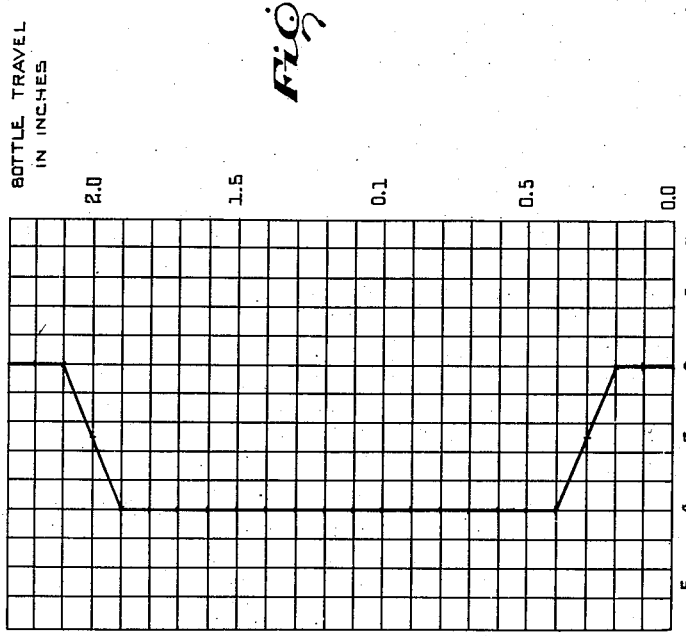
Inventor
James H. Reynolds.
By
Attorney Patented Aug. 26, 1941

2,253,581

UNITED STATES PATENT OFFICE 2,253,581

CONTINUOUS INSPECTION DEVICE

James H. Reynolds, Baltimore, Md., assignor to The Coca-Cola Company, Wilmington, Del., a corporation of Delaware Application July 1, 1939, Serial No. 282,395

5 Claims. (Cl. 88—14)

This invention relates to the inspection of fluids in bottles for the purpose of ascertaining the possible presence of foreign ingredients therein, and has as an object the provision of improvements upon the method and machine of this character disclosed in United States Patent No. 2,132,447, issued October 11, 1938, G. P. Stout inventor.

Another object of the present invention is to improve upon the process of inspection described and claimed in said patent.

Another object is to provide apparatus for and a method of allowing more rapid inspection than has heretofore been deemed possible.

Another object is to provide means for more positive inspection.

A still further object is to effect simplification of a machine of the instant type, eliminating sundry parts heretofore considered necessary.

Another object is to make inspection more positive by eliminating certain moving parts, particularly those carrying the optics, thereby reducing vibration.

An understanding of these and other objects made clear during the further progress of this specification will be facilitated by reference to the drawings herein, in which:

Fig. 2 is an enlarged side view, partially in section, showing a bottle being inspected;

Fig. 3 is an enlarged plan view of my improved brake structure taken along the line 3—3 of Fig. 2, looking in the direction of the arrows;

Figs. 4, 5 and 6 are top views, largely diagrammatic, illustrating a bottle under inspection passing through the light beam;

Fig. 7 is likewise a diagrammatic view showing, however, an arrangement in which double light beams are used; and Fig. 8 is a graph showing the photocell current plotted against the position of the bottle as same passes through the double light beams shown in Fig. 7.

Figure 1:
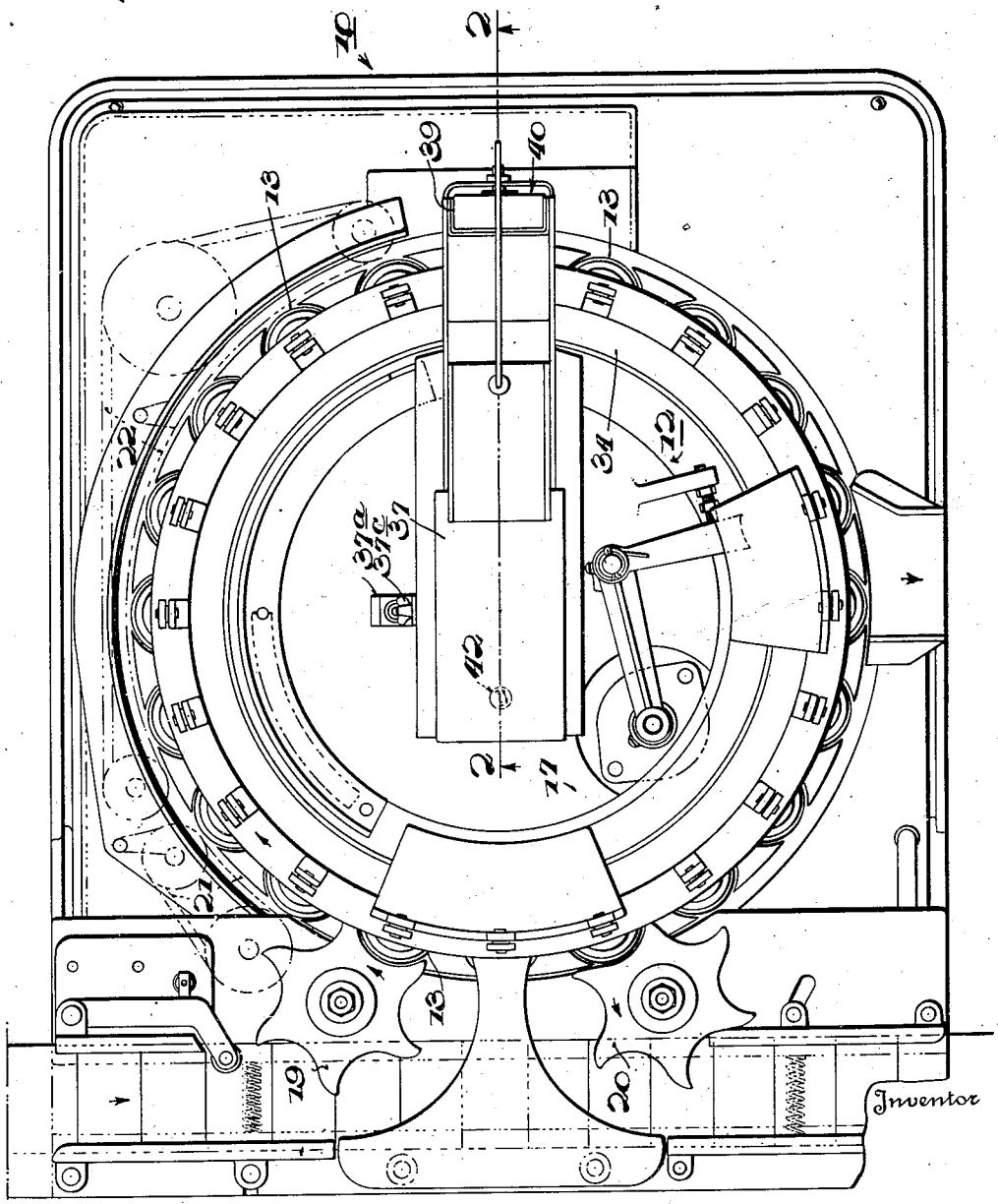
Fig. 1 is a top plan view of my improved device.

Referring now to the drawings, Figs. 1 and 2, the instant machine comprises a supporting structure 10 from which emerges a hollow central standard 11, mounted for revolution upon which is a turret 12 which may be caused to rotate clockwise in any conventional manner. Mounted for revolution in said turret and adjacent its periphery is a plurality of bottle cups 13 carried by hollow stems 14, each being provided with a drum 15 for the purpose of revolving the cup and also for abruptly stopping same at a designated time as is explained hereafter. Turret 12 may be mounted upon ball bearings 16 in conjunction with standard 11, said standard having a turret cover plate 17 secured by cap screws 18 at its upper edge.

To feed bottles into cups 13 there is shown a star wheel 19 calculated to operate in a manner conventional with bottle handling machinery; and to remove bottles from the cups there is provided a star wheel 20, the infeed and outfeed devices being synchronized to work in unison with the revolution of the turret.

For the purpose of revolving the bottles and the contents thereof, there are shown friction bands 21 and 22 (Fig. 1), same being driven in any suitable manner, as by a motor for example. It is possible to drive the bands in opposite directions so that a cup upon leaving the influence of one band is immediately jerked in the opposite direction by the other, an improved agitating and mixing action being secured by such procedure, particularly if the speed of band 22 is relatively greater than that of 21; or the bands may move in the same direction at approximately equal speeds; or one band may move faster than the other but in the same direction; or in the interest of simplification, one band may be eliminated entirely. In any event, it is apparent that the bands acting upon drums 15 turn individual cups 13 in such a manner that same are rotating rapidly when they come within the range of the optical system, at which time the cups and bottles are abruptly stopped by means of individual brakes to which special attention is now directed.

These brakes (Fig. 3) comprise a stationary cam-like member 23 fixedly mounted to supporting structure 10 through pins 24 and held outwardly by means of strong springs 25. It will be noted that the outer face of element 23, and particularly that portion thereof at the end from which bottles approach, is sloped as at 23a in such manner as to deflect an object contacting said surface and member. Brake arms 26, having surfaces 27 similar to 23a, are pivotally mounted as at 28, and carry brake shoes 29 and brake linings 30. A spring 31 serves to hold brake arms 26 normally out of engagement with drums 15 and hence the brake open, except during such time as surfaces 26 and 27 thereof are in contact with element 23.

Mounted upon revolving turret 12 is a circular wall 32 having windows or apertures 33 opposite each of the cups 13, said wall 32 carrying an upper ring 34 in which are revolvably mounted spindles 35, each carrying a cup 36 for engagement with the caps of bottles, thereby keeping the bottles centered during revolution and while they are in the machine.

The testing of the contents of the bottles for foreign bodies as described in said United States Patent No. 2,132,447 is carried out by the passage of radiant energy through the bottles and contents while the former are stationary and the latter in motion. The details of the optical equipment (said term being used broadly to include the light source and photo-electric cell) and the circuits involved do not, except as specifically pointed out hereafter, form part of the present invention, and may be similar to those disclosed in the aforementioned patent, it having been found commercially desirable, however, that response to the presence of a foreign body in a bottle shall cause the breaking of a control circuit instead of making up such a circuit as described in the patent, this arrangement making the machine "fail safe" in the event anything should be the matter with the vital circuits thereof.

According to the teachings of said patent, however, it is necessary, or at least desirable, that the optics and the bottle be stationary at the time inspection occurs. To avoid stopping the line of bottles for each inspection, apparatus has heretofore been devised to allow the optics to move forward a stated distance with the bottle during the brief period that inspection is occurring, said optics then being required to return to their original position before they can pick up another bottle and perform an inspection operation with reference thereto. It has been found that inspection in this manner is practicable up to around 120 bottles per minute, at which speed there is available .5 second for each bottle cycle when standard 6-ounce containers are being inspected. However, since the optics must be returned as above indicated, only about 50% of this time may be used for actual inspection. Obviously a certain minimum period is necessary for accurate inspection, and accordingly potential speed of production is cut in half by this lost motion. Aside from this, additional working parts are required to effect the synchronized cam action inherent in having the optics follow the bottle, and in addition, certain vibration is set up in this movement which may impair to a degree the super-sensitive inspection means which are generally set to detect the presence of a glass bead as small as 2 millimeters in diameter.

A prominent feature of the instant invention lies in holding the optics stationary and at the same time allowing the forward motion of the bottle to continue, the bottle in effect entering and leaving the beam of light focused upon the photoelectric cell and inspection being carried out during this time.

Effectuation of the foregoing inventive concept lies in the use of an amplifier acting upon the output of the photoelectric cell, whose characteristics may be so controlled as to attenuate the impulses caused by the motion of the bottle in the light beam and at the same time accentuate the impulses caused by the movement of a foreign particle in the bottle. In the present system of inspection the relative linear velocities of the bottle through the light beam and the rotating particle in the bottle are such that the electrical impulses resulting from the movement of the bottle and the particle in the light beam are substantially different, and are thus responsive to selective treatment in the amplifier connected to the output of the photocell.

The optical structure employed includes a rigidly mounted light box 37 (Fig. 2) having an upwardly directed portion 38 connected to a vertical member 39 carrying the light-sensitive cell 40 in a casing 41, such an arrangement making possible the movement of bottles into and out of the beam of radiant energy while same is focused upon the photocell, as is explained in greater detail hereafter.

If desired, box 37 may be adjustably mounted upon bracket 37a, elongated slot 37b in conjunction with tightening element 37c facilitating vertical adjustment of this member. For example, the loosening of winged nut 37c (Fig. 1) will permit the box to be lowered, the bolt upon which said nut operates serving as a guide means in slot 37b of the bracket 37a. When the desired elevation is attained, the winged nut is again tightened, upon which the box 37 again becomes rigidly mounted.

A light source 42, behind which is positioned a reflector 43, is suitably positioned within box 37, and a lens 44 placed in such relationship to said light source as to direct rays of energy through the opening 45 in the front of the box and through openings 33 of the wall 32 in such manner as to expose the contents of a bottle registering with said openings to said rays, same passing through the bottle and on to light-sensitive cell 40 on the other side thereof.

Figs. 4, 5 and 6 illustrate the passage of a bottle through the inspection field. In Fig. 4 the image of the light source appears at 46, extending from the bottom of the bottle to just below the top liquid surface (see Fig. 2). Fig. 5 shows the bottle at the axis of the optical system and photocell, experimentation having disclosed a tendency on the part of the image of the light source to follow the inside surface of the bottle so that the rays now primarily center at point 47. In Fig. 6 the bottle has continued its progress and likewise the point of focus has moved on the far inside surface of the bottle to 48, the container now being just before leaving the light beam.

In Fig. 7 I have shown a modified form of lens constructed in two segments 49 and 50, there being an opaque portion 51 in the middle, this structure providing double light beams 52 and 53.

Fig. 8 is a graph showing the photocell current plotted against the position of the bottle as same passes through dual light beams 52 and 53. Inspection starts at the zero point and is completed at 2.3 inches. The static current for the first .2 inch is that resulting from light beam 52 and from .2 to .4 inch the second light beam 53 is picked up gradually, the current increasing to 4 ma., and remaining steady there until at 1.9 inches the first light beam begins to leave the bottle and the current to drop. At 2.1 inches we have lost the first light beam completely and at 2.3 the second light beam commences to leave the bottle. It may be noted that the change in current as the second light beam is picked up and dropped is very even, and the entire period may be used for inspection.

With either arrangement, the beam of light emerging from the bottle focuses upon the light-sensitive cell, and when a foreign object passes through the beam an electrical impulse results, such being amplified and employed to operate reject mechanism in any conventional manner.

From the foregoing, it is believed that the operation of my device and employment of my new method of inspection have been made entirely clear. Bottles are taken from the conveyor line by star wheel 19, rotated rapidly as by bands 21 and 22, and approaching brake member 23, are abruptly stopped by virtue of brake arms 26 having been forced inwardly upon surface 27 coming in contact with surface 23a, this action forcing brake shoe 29 and its lining 30 against drum 15 in such manner as to abruptly check the rotary movement thereof. At this instant the bottle is entering the field of radiant energy set up by light source 42, as suggested in Fig. 4, and the contents of the container are still swirling rapidly, with the result that any foreign particle therein will be required to pass one or more times through the light beam during the lateral movement of the bottle across the opening provided by apertures 33 and 45. It will be noted that the centrifugal force set up by rotation of contents tends to force any particle therein towards the outer edge of the inside of the bottle, and for this reason good practice dictates the focusing of the light beam at this point. As previously stated, any interruption in said beam immediately acts to set up an electrical impulse in the photo cell which is in turn utilized to accomplish the desired result of throwing out or rejecting the bottle in which the foreign ingredient causing such impulse is to be found.

It is believed that my invention, making possible as it does the rapid, continuous inspection of bottled beverages, marks a distinct advance in the art, since commercial production may be thereby speeded up, numerous moving parts eliminated, vibration reduced, and a more positive and satisfactory job of inspection achieved.

While I have described in some detail certain apparatus which may be employed in conjunction with my method, I do not bind myself thereby, on the contrary intending that the appended claims shall be accorded an interpretation and scope fairly in keeping with my contribution to the art.

I claim:

1. Apparatus of the class described comprising, in combination: radiant energy means to inspect liquid contained in closed packages; means to move the packages to and from a point of inspection; means, including drums, to rotate said packages so as to cause motion of the liquid therein; and brake means to stop the rotary movement of said packages before inspection of the contents thereof, said means comprising a cam-like member fixedly mounted adjacent the point of inspection, and individual brake arms pivotally mounted in conjunction with said rotating means so as to frictionally engage the drums of such upon coming into contact with said cam-like members.

2. Apparatus of the class described comprising, in combination: radiant energy means to inspect liquid contained in bottles; means to continuously move the bottles to and from a point of inspection; and means, including drums, to rotate said bottles so as to cause motion of the liquid therein; and brake means to stop the rotary movement of the bottles before inspection of the contents thereof, said means comprising a cam-like member fixedly mounted adjacent the point of inspection, and individual brake arms pivotally mounted in conjunction with said rotating means so as to frictionally engage the drums of such upon coming into contact with said cam-like members, brake shoes carried by said brake arms, and brake linings anchored within said shoes.

3. Apparatus of the class described comprising, in combination: means to continuously move a series of bottles to and from a fixed point of inspection, a stationary optical system mounted at said point of inspection for projecting a beam of light across the path of movement of the bottles at the point of inspection, means to rotate said bottles whereby the liquid contents thereof are caused to rotate, brake means to stop the rotary movement of the bottles immediately before inspection of the contents thereof, a photo-sensitive mechanism positioned at the point of inspection to receive the said light beam after such has passed through a bottle being inspected, and means limiting the response of said photo-sensitive mechanism to impulses of substantially higher frequencies than those generated by the continuous forward movement of the bottles in the machine.

4. Apparatus of the class described comprising, in combination: means to continuously move a series of bottles to and from a fixed point of inspection, a stationary optical system mounted at said point of inspection for projecting a beam of light across the path of movement of the bottles at the point of inspection, said optical system including a lens having a plurality of segments spaced by an opaque partition whereby a series of light beams are projected at the point of inspection, means to rotate said bottles whereby the liquid contents thereof are caused to rotate, brake means to stop the rotary movement of the bottles immediately before inspection of the contents thereof, a photo-sensitive mechanism positioned at the point of inspection to receive the said light beams after such have passed through a bottle being inspected, and means limiting the response of said photo-sensitive mechanism to impulses of substantially higher frequencies than those generated by the continuous forward movement of the bottles in the machine.

5. The method of inspecting fluids contained in transparent packages to detect the presence of foreign ingredients therein, which consists of rotating the contents of the packages, moving the packages successively forward past a point of inspection, passing a fixed beam of radiant energy through each container while the contents are rotating and while the package is moving relative to the beam, and selectively detecting impulses set up by abrupt changes in intensity of transmitted energy caused by the movement of a foreign body into or out of said beam.

JAMES H. REYNOLDS.